INVENTOR.
HARRY C. MORROW
BY Donald G. Dalton
ATTORNEY

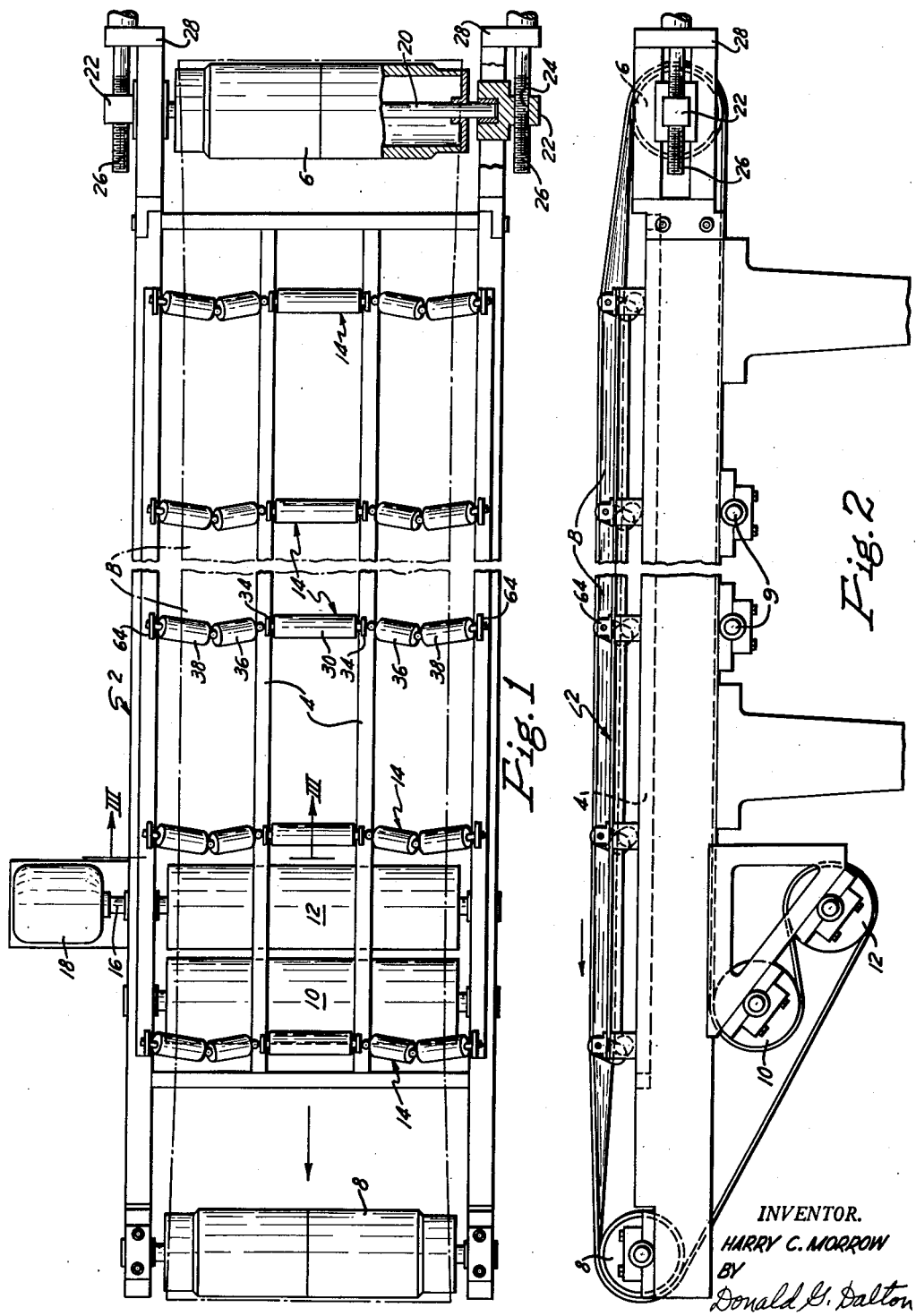

United States Patent Office 3,043,419
Patented July 10, 1962

1

3,043,419
TROUGHED BELT CONVEYOR
Harry C. Morrow, Pittsburgh, Pa., assignor to United States Steel Corporation, a corporation of New Jersey
Filed May 28, 1959, Ser. No. 816,557
6 Claims. (Cl. 198—192)

This invention relates to a troughed belt conveyor and more particularly to a conveyor of the type shown in my co-pending application, Serial No. 658,725 filed May 13, 1957, now Patent No. 2,897,955, of which this application is a continuation-in-part. The belt conveyor of my previous application is satisfactory for those conveyors which travel in a single direction, but it is not suitable for conveyors which are reversible. Therefore, reversible belt conveyors must be made in various other ways which do not satisfactorily track the belt. In such previous belt conveyors adjustment of the supporting rolls is necessary, not only when reversing the direction of belt travel, but also during operation of the belt in either direction. I have also found that an arrangement of rolls other than that disclosed in my above mentioned application will also function to center the belt.

It is therefore an object of my invention to provide a troughed belt conveyor in which lateral movement of the belt is limited regardless of the distribution of the load on the belt.

Another object is to provide a troughed belt conveyor which is reversible and in which lateral movement of the belt is limited regardless of the distribution of the load on the belt or the direction of travel of the belt.

These and other objects will be more apparent after referring to the following specification and attached drawings, in which:

FIGURE 1 is a top plan view of the conveyor of my invention;

FIGURE 2 is a side elevation of the conveyor of FIGURE 1;

Figure 3:
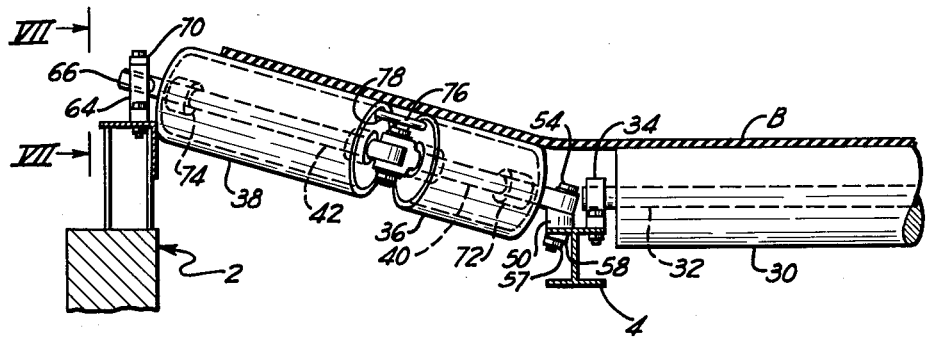
FIGURE 3 is a view taken on the line III—III of FIGURE 1.
Figure 4:
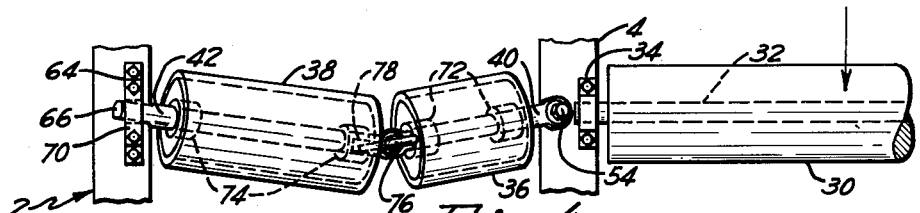
FIGURE 4 is a plan view of FIGURE 3.
Figure 5:
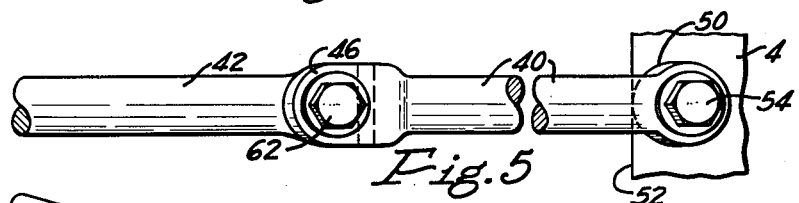
FIGURE 5 is a plan view of the roll shaft construction.
Figure 6:
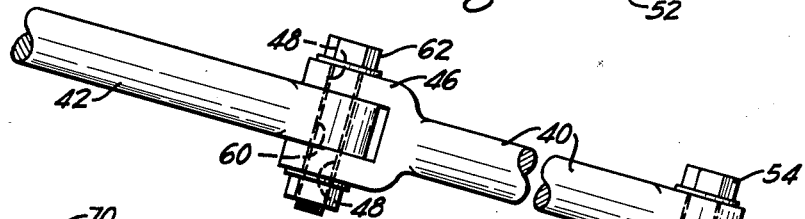
FIGURE 6 is an elevation of the roll shaft of FIGURE 5.
Figure 7:
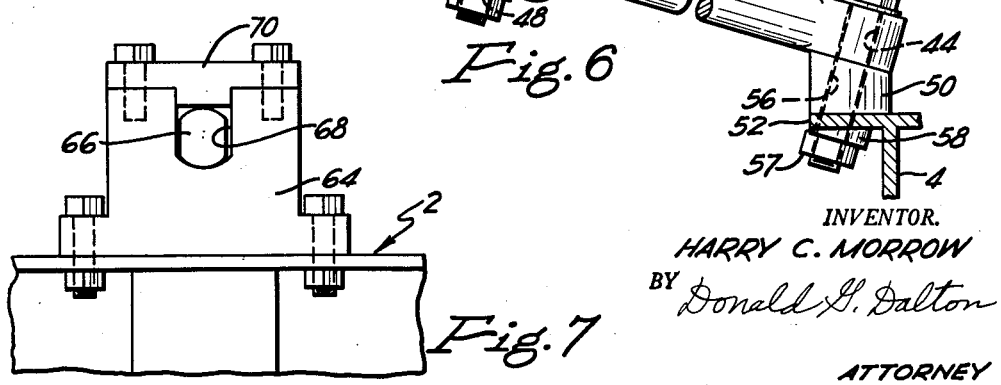
FIGURE 7 is a view taken on the line VII—VII of FIGURE 3.

Referring more particularly to the drawings reference numeral 2 indicates a longitudinal pedestal for supporting one side of the conveyor. A similar pedestal is used for supporting the other side of the conveyor, but only one pedestal will be described since their construction is the same. A longitudinal center pedestal 4 is provided on each side of the center line of the conveyor. The center pedestals 4 are supported from the pedestals 2 as shown. An endless belt B passes around end rolls 6 and 8, over return idler rolls 9 and around a drive bridle consisting of a narrow bodied self-centering roll 10 and a cylindrical self-centering roll 12. A plurality of roll assemblies 14 are provided between rolls 6 and 8 for supporting the upper run of the belt. The rolls 6 and 8 are shown as narrow bodied self-centering rolls of the type shown in Lorig Patent No. 2,593,158 dated April 15, 1952, but may be of the type shown in Lorig Patent No. 2,592,581 dated April 15, 1952. These rolls are preferably narrow bodied, that is, they have a cylindrical strip supporting surface of less width than the width of the belt. Roll 10 is preferably a narrow bodied roll of the type shown in Lorig Patent No. 2,592,581 and roll 12 is preferably a full bodied cylindrical roll of the same type. The roll 12 is provided with a shaft extension 16

2 so that it can be driven by a reversible motor 18. The roll 6 is provided with a shaft 20 having each of its ends supported in a movable bracket 22 supported on the pedestals 2. Each of the brackets 22 is provided with a threaded opening 24 for receiving a threaded shaft 26 which is mounted in a stationary bracket 28. Each of the roll assemblies 14 includes a central substantially cylindrical roll 30 arranged with its axis substantially parallel to the axis of the rolls 6 and 8. The roll 30 is preferably mounted for rotation on a shaft 32, the ends of which are supported in a bracket 34 mounted on pedestals 4. If desired roll 30 may be a self-centering roll of the type disclosed in the above mentioned Lorig patents, but for most purposes a plain cylindrical roll will be used. A substantially cylindrical roll 36 is provided on each side of the central roll 30 and a substantially cylindrical roll 38 is provided at the outer end of each roll 36. The rolls 36 and 38 are mounted on shafts 40 and 42, respectively. Shaft 40 has a hole 44 at its inner end, the axis of which is generally normal to the plane of belt B, and a bifurcated outer end 46 with aligned generally vertical openings 48 therein, the axes of which are generally mormal to the plane of belt B. A wedge-shaped member 50 is arranged on top of flange 52 of pedestal 4. A bolt 54 passes downwardly through opening 44 and aligned openings 56 in member 50 and flange 52 with a nut 57 being threaded on its lower end. A wedge washer 58 is preferably provided between the bottom of the flange 52 and the nut 57. The inner end of shaft 42 is received between the bifurcations 46 and has an opening 60 therein which is in alignment with opening 48. A bolt 62 passing through openings 48 and 60 pivotally connects the shafts 40 and 42. The outer end of shaft 42 is received in a bracket 64 which is mounted on top of pedestal 2. The outer end 66 of the shaft 42 is noncircular and is received in opening 68 of the pedestal 64. A cover 70 may be attached to the pedestal 64 to limit upward movement of the shaft end 66. The size of opening 68 is somewhat greater than the cross-section of the shaft end 66. Bearings 72 on the shaft 40 rotatably support the roll 36 and bearings 74 on the shaft 42 rotatably support the roll 38. The length of the roll 38 is preferably greater than that of the roll 36. The ends of the shafts 42 are preferably substantially in the vertical plane through the axis of roll 32. A pin 76 is preferably received in each roll 36 and extends into an opening 78 in the associated roll 38 so that the rolls 36 and 38 will rotate in unison as in my above mentioned application.

The operation of the conveyor is as follows:

The shaft 20 is arranged parallel to the axis of the roll 8 by means of adjusting screws 26 and sufficient tension is also applied to the belt B in this manner. The belt is then rotated in the direction of the arrow by means of the motor 18. The belt B sags slightly downwardly between the roll assembly 14 so that there is some wrap of the belt around the rolls of assemblies 14. This causes the rolls 36 and 38 to assume the position shown in FIGURE 1 which is the opposite to the permanent position of the rolls in my above mentioned application. In other words the axis of each of the rolls 36 extends upwardly from the center roll 30 away from the direction of the approach of the belt B and the axis of the associated roll 38 extends upwardly toward the direction of approach of the belt B.

When the direction of travel of belt B is reversed by changing the direction of rotation of motor 18, the belt B will cause each of the rolls 36 to swing about its associated pivot bolt 54 and each of the rolls 38 to pivot in the same direction with shaft 42 sliding outwardly in the opening 68 and then inwardly to permit this travel. The size of opening 68 is such that the shaft can move freely from one position to the other. Thus the rolls 36 and 38 assume the same relationship with respect to belt travel as when the belt is traveling in the opposite direction and the centering action of the assembly will be the same in either direction. While all of the roll assemblies 14 are shown as centering assemblies it will be understood that some conventional roll assemblies may be used, it only being necessary that sufficient centering roll assemblies be provided to keep the belt centered on the rolls. In the case of unidirectional conveyors the rolls of the roll assemblies may be permanently fixed.

While one embodiment of my invention has been shown and described, it will be apparent that other adaptations and modifications may be made without departing from the scope of the following claims.

I claim:

1. A troughed belt conveyor comprising a pair of end rolls for supporting said belt, and a plurality of roll assemblies for supporting the troughed belt, at least part of said roll assemblies including a center roll means for rotatably supporting said center roll in fixed position with its axis substantially parallel to the axis of the end rolls, a roll on each side of said center roll having its axis extending upwardly from said center roll away from the direction of approach of said belt and a roll at the outer end of each of said last named rolls having its axis extending upwardly from the outer end of the roll adjacent thereto and toward the direction of approach of said belt.

2. A troughed belt conveyor comprising a pair of end rolls for supporting said belt, and a plurality of roll assemblies for supporting the troughed belt, at least part of said roll assemblies including a first roll, means for rotatably supporting said first roll in fixed position with its axis substantially parallel to the axis of the end rolls, a second roll on each side of said first roll having its axis extending upwardly and outwardly from said first roll, means pivotally supporting the inner end of each of said second rolls for movement generally parallel to the plane of said belt, a third roll at the outer end of each of said second rolls having its axis extending upwardly and outwardly from the associated second roll, means pivotally supporting the outer end of each of said third rolls for movement generally parallel to the plane of said belt and means pivotally connecting the adjacent ends of the associated second and third rolls.

3. A troughed belt conveyor comprising a pair of end rolls for supporting said belt, each of said end rolls being self-centering rolls, and a plurality of roll assemblies for supporting the troughed belt, at least part of said roll assemblies including a first roll, means for rotatably supporting said first roll in fixed position with its axis substantially parallel to the axis of the end rolls, a second roll on each side of said first roll having its axis extending upwardly and outwardly from said first roll, means pivotally supporting the inner end of each of said second rolls for movement generally parallel to the plane of said belt, a third roll at the outer end of each of said second rolls having its axis extending upwardly and outwardly from the associated second roll, means pivotally supporting the outer end of each of said third rolls for movement generally parallel to the plane of said belt and means pivotally connecting the adjacent ends of the associated second and third rolls.

4. A troughed belt conveyor comprising a pair of end rolls for supporting said belt, each of said end rolls being self-centering rolls, and a plurality of roll assemblies for supporting the troughed belt, at least part of said roll assemblies including a center roll means for rotatably supporting said center roll in fixed position with its axis substantially parallel to the axis of the end rolls, a roll on each side of said center roll having its axis extending upwardly from said center roll away from the direction of approach of said belt and a roll at the outer end of each of said last named rolls having its axis extending upwardly from the outer end of the roll adjacent thereto and toward the direction of approach of said belt.

5. A troughed belt conveyor comprising a pair of end rolls for supporting said belt, and a plurality of roll assemblies for supporting the troughed belt, as least part of said roll assemblies including a center roll means for rotatably supporting said center roll in fixed position with its axis substantially parallel to the axis of the end rolls, a shaft on each side of said center roll having its axis extending upwardly and outwardly from said center roll, a pivot support for the inner end of said shaft, said pivot support having its axis in a plane generally normal to the plane of the belt, a second shaft having its axis extending upwardly and outwardly from each of said first named shafts, a pivot connection between the outer end of each of said first named shafts and the associated second named shaft, the axis of said pivot connection being generally normal to the plane of the belt thereabove, a support for the outer end of each of said second shafts, said last named support permitting axial and pivotal movements of said second shaft, a roll rotatably mounted on each of said first named shafts and a roll rotatably mounted on each of said second shafts, each of said first named shafts pivoting about its pivot and each of said second shafts pivoting about its outer support for movement generally parallel to the plane of the belt whereby the axis of each roll on said first named shafts extends upwardly away from the direction of approach of said belt and the axis of each roll on said second named shafts extends upwardly toward the direction of approach of said belt.

6. A troughed belt conveyor comprising a pair of end rolls for supporting said belt, each of said end rolls being self-centering rolls, and a plurality of roll assemblies for supporting the troughed belt, at least part of said roll assemblies including a center roll means for rotatably supporting said center roll in fixed position with its axis substantially parallel to the axis of the end rolls, a shaft on each side of said center roll having its axis extending upwardly and outwardly from said center roll, a pivot support for the inner end of said shaft, said pivot support having its axis in a plane generally normal to the plane of the belt, a second shaft having its axis extending upwardly and outwardly from each of said first named shafts, a pivot connection between the outer end of each of said first named shafts and the associated second named shaft, the axis of said pivot connection being generally normal to the plane of the belt thereabove, a support for the outer end of each of said second shafts, said last named support permitting axial and pivotal movements of said second shaft, a roll rotatably mounted on each of said first named shafts and a roll rotatably mounted on each of said second shafts, each of said first named shafts pivoting about its pivot and each of said second shafts pivoting about its outer support for movement generally parallel to the plane of the belt whereby the axis of each roll on said first named shafts extends upwardly away from the direction of approach of said belt and the axis of each roll on said second named shafts extends toward the direction of approach of said belt.

References Cited in the file of this patent

UNITED STATES PATENTS

| | | |
|---|---|---|
| 785,569 | Plunket | Mar. 21, 1905 |
| 1,633,153 | Wray | June 21, 1927 |
| 2,847,114 | Orr | Aug. 12, 1958 |
| 2,862,608 | Newton | Dec. 2, 1958 |
| 2,880,851 | Salmons | Apr. 7, 1959 |
| 2,897,955 | Morrow | Aug. 4, 1959 |